United States Patent [19]

Bleier

[11] Patent Number: 4,729,547

[45] Date of Patent: Mar. 8, 1988

[54] CAR MOVING LEVER ASSEMBLY

[76] Inventor: Frank P. Bleier, 536 W. Cornelia Ave., Chicago, Ill. 60657

[21] Appl. No.: 938,541

[22] Filed: Dec. 5, 1986

Related U.S. Application Data

[63] Continuation-in-part of Ser. No. 831,931, Feb. 20, 1986, abandoned.

[51] Int. Cl.4 .................... B60S 9/02

[52] U.S. Cl. .................... 254/35

[58] Field of Search .................... 254/120, 121, 131, 132, 254/35, 36, 17, 25, 113, 119, 15, 30, 129

[56] References Cited

U.S. PATENT DOCUMENTS

| | | | |
|---|---|---|---|
| 579,352 | 3/1897 | Smith | 254/131 |
| 1,260,041 | 3/1918 | Powell | 254/132 |
| 1,807,142 | 5/1931 | Achenbach | 254/119 |
| 2,718,375 | 9/1955 | Purdy | 254/131 |
| 3,331,584 | 7/1967 | Schwartz | 254/15 |
| 3,614,115 | 10/1971 | Berglund | 254/35 |
| 4,180,253 | 12/1979 | Ivers et al. | 254/131 |
| 4,280,684 | 7/1981 | LeVert | 254/35 |
| 4,348,010 | 9/1982 | Boxter | 254/131 |

FOREIGN PATENT DOCUMENTS

| | | | |
|---|---|---|---|
| 385558 | 12/1932 | United Kingdom | 254/132 |

*Primary Examiner*—Robert C. Watson
*Attorney, Agent, or Firm*—Edward W. Osann, Jr.

[57] ABSTRACT

A knock-down lever assembly which enables the driver of a disabled automotive vehicle to move it manually for relatively short distances without assistance from others. The device permits the vehicle to be moved manually away from a lost traction area such as a pavement covered with snow, ice, mud, oil or other slippery substances, or from a traffic lane to the shoulder of the road.

13 Claims, 13 Drawing Figures

FIG 1
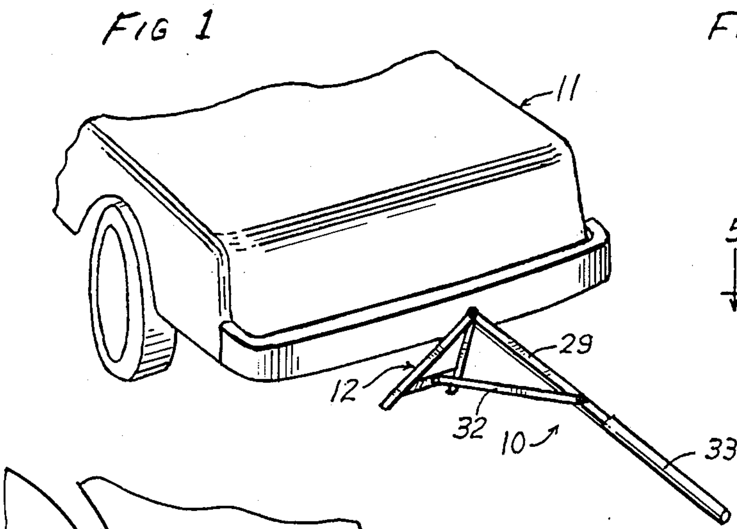
FIG. 3
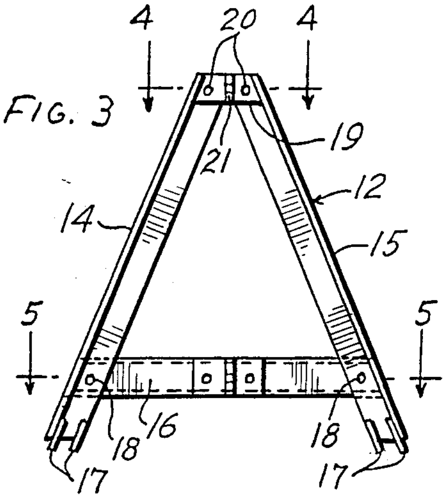
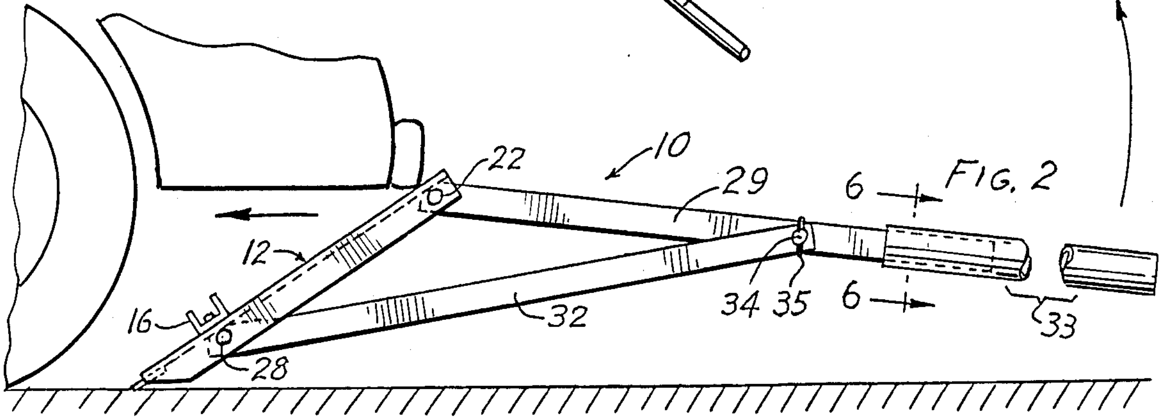
FIG. 2
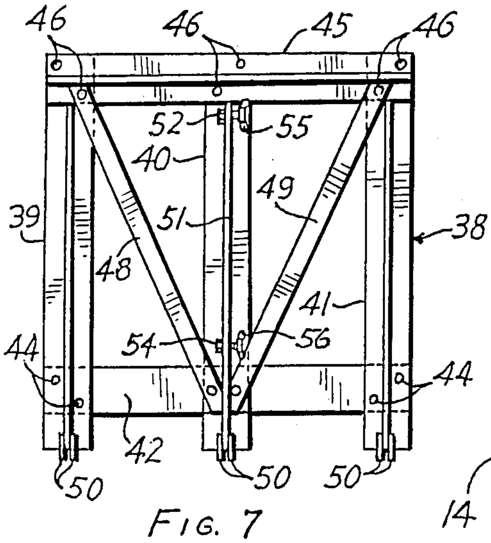
FIG. 7
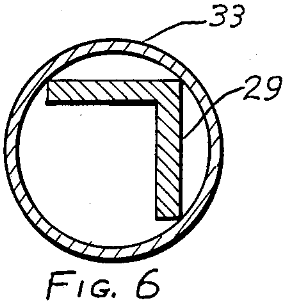
FIG. 6
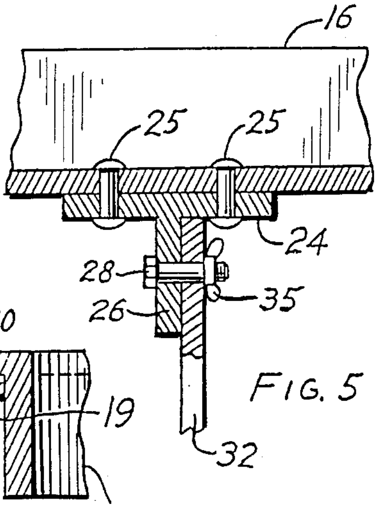
FIG. 5
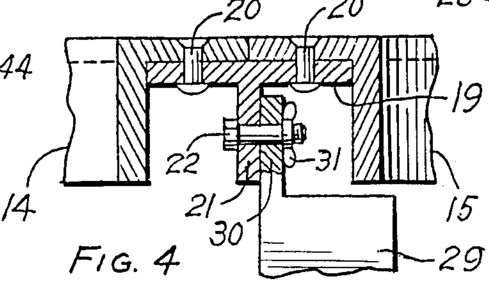
FIG. 4

CAR MOVING LEVER ASSEMBLY

BACKGROUND OF THE INVENTION

This application is a continuation-in-part of my copending U.S. patent application Ser. No. 831,931, filed Feb. 20, 1986 now abandoned.

The present invention relates to a knock-down lever assembly which enables the driver of a disabled automotive vehicle to move same manually for relatively short distances without additional assistance. Such action may be necessitated by a variety of conditions such as slippery pavement, engine trouble, or a flat tire in a spot where the jack could not readily be used.

Heretofore, various configurations of manually actuated lever devices have been developed to enable a single individual to move a vehicle such as a rail car or automobile through a short distance such as a few feet, or, in the case of a rail car, a hundred feet or more. These devices were large, heavy, slow and cumbersome to operate. Examples of such devices are shown in the following patents:

| Patent No. | Patentee | Country | Date Issued |
|---|---|---|---|
| 141,159 | Moore | United States | 1873 |
| 294,380 | Grimm | United States | 1884 |
| 423,437 | Mellenthin | United States | 1890 |
| 611,747 | Wise | United States | 1898 |
| 1,340,238 | Nash | United States | 1920 |
| 112,964 | Rohlmann | Germany | 1899 |

Specific applications of other lever devices are found in the following additional patents, respectively, for removing wagon wheel tires, a log jack, lifting a hand truck, a motorcycle jack, and a weed extractor.

| Patent No. | Patentee | Country | Date Issued |
|---|---|---|---|
| 579,352 | Smith | United States | 1897 |
| 2,718,375 | Purdy | United States | 1955 |
| 3,614,115 | Berglund | United States | 1971 |
| 4,348,010 | Baxter | United States | 1982 |
| 385,558 | Cunynghame | Great Britain | 1932 |

The lever assembly disclosed and claimed herein differs materially in structure and ease of operation from each of the lever devices shown in the two groups of patents listed above. None of the lever devices shown in any of these patents is adapted to be deployed against the bumper of an automotive vehicle to move same off of a lost traction area.

SUMMARY OF THE INVENTION

One object of the present invention is to provide a lever assembly which enables the driver of a disabled automotive vehicle to move it manually away from a lost traction area without additional assistance.

Another object of the invention is to provide a lever assembly of the type set forth above which is susceptible of being quickly assembled for use and quickly disassembled for storage after use.

A further object is to provide a lever assembly of the foregoing character and which when disassembled can be compactly packaged and stored.

Still another object is to provide a knock-down lever assembly of the above type which is sufficiently sturdy that it can be used effectively on a variety of automotive vehicles, including passenger cars, sports cars, station wagons, vans, and pick-up trucks.

Another object of the invention is to provide a lever assembly of the character set forth above which is of simple, rugged construction and economical to manufacture.

The foregoing is accomplished by use of a drive cradle which may have the form of an "A" frame, a rectangular frame, or an inverted "T" frame, each having laterally spaced ground engaging teeth; an actuating arm detachably connected at one end to the upper portion of the cradle, a tensile strut detachably connected at one end to the lower portion of the cradle and at its other end detachably connected to an intermediate point on the actuating arm to define a triangle, and a handle connected to the opposite end of the actuating arm, the drive cradle, actuating arm and tensile strut being fashioned from structural angle which may be aluminum, steel, or other metallic or non-metallic material of comparable strength.

Other objects and advantages of the invention will become apparent from the following description and the accompanying drawings.

BRIEF DESCRIPTION OF THE DRAWINGS

FIG. 1 is a perspective view of a lever assembly exemplifying the present invention disposed for use in moving a disabled automobile over a lost traction area.

FIG. 2 is an enlarged side elevational view of the lever assembly of FIG. 1 in position for manual actuation to move the disabled automotive vehicle in the direction shown by the arrow.

FIG. 3 is an enlarged front elevational view of the "A" frame cradle of the lever assembly.

FIGS. 4 and 5 are further enlarged, fragmentary views detailing the attachment points of the "A" frame, taken in the planes of the lines 4—4 and 5—5, respectively.

FIG. 6 is a still further enlarged transverse sectional view through the actuating arm and handle, taken in the plane of the line 6—6 in FIG. 2.

FIG. 7 is an enlarged front elevational view of the rectangular drive cradle also embodying the present invention.

Figure 8:
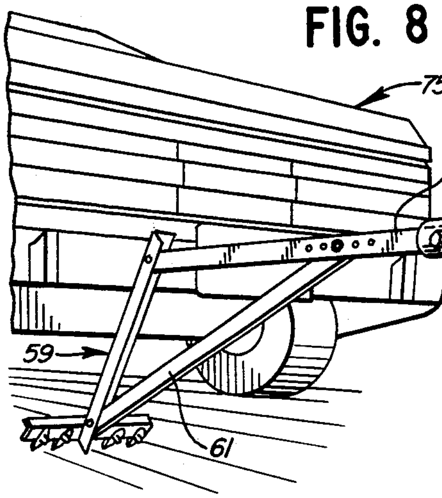
FIG. 8 is a perspective view of still another form of lever assembly with an inverted T-shaped drive cradle also embodying the present invention.

While the present invention is susceptible of various modifications and alternative constructions, there is no intention to limit the invention to the specific forms illustrated and described herein. On the contrary, the intention is to cover all modifications and alternative constructions falling within the spirit and scope of the invention as set forth in the appended claims.

DETAILED DESCRIPTION OF THE INVENTION

Referring more specifically to FIGS. 1–6, the invention is there exemplified in a novel manually actuated lever assembly 10 for moving the vehicle 11 away from a lost traction area, or from a traffic lane to the shoulder of the road. Such an area may be covered with snow, ice, oil, mud or the like. On the other hand, the traction area might be acceptable but the vehicle may have engine or tire trouble, requiring that it be moved onto the shoulder.

In accordance with the invention, the lever assembly 10 comprises a drive cradle 12 which, in this instance, happens to be in the form of an "A"-frame (FIGS. 1–3). The drive cradle 12 comprises a pair of upwardly converging arms 14, 15, in this case formed from structural angle, and a connecting cross member 16 adjacent the lower ends of the arms. The arms, 14, 15 may be provided with laterally spaced ground engaging prongs 17 to eliminate slippage. The member 16 may be formed from structural angle or channel, preferably of aluminum or other material of comparable weight and strength. For reasons of enhanced stiffness, the channel member 16 is attached to the arms 14, 15 with its back against the rear faces of the arms (as viewed in FIG. 3) and with its flanges projecting rearwardly away from the arms. The member 16 may be secured to the arms 14, 15 as by rivets 18.

The drive cradle 12 is provided at its upper end with a connector bracket 19 of T-shaped cross section (FIGS. 3 and 4). The bracket 19 is secured to the front faces of the arms 14, 15 as by rivets 20 which in this case have countersunk heads on their rearward ends. As shown in FIG. 4, the forwardly projecting flange 21 of the bracket 19 has a transverse bore which houses attachment bolt 22. The bolt 22 may be tack welded in place or press fit in the bore.

The cross member 16 of the drive cradle includes a similar connector bracket 24 of T-shaped cross section, as shown in FIG. 5. The bracket 24 is secured to the forward face of the cross member at its appropriate center by means of rivets 25. The bracket 24 has a forwardly projecting flange 26 with a transverse bore housing attachment bolt 28. The latter may also be tack welded in place or press fit into the bore.

Provision is made in the lever assembly 10 for applying an amplified force to the drive cradle 12 of sufficient strength to move the car forward. For this purpose, a relatively long actuating arm 29 is secured to the upper connector bracket 19 (FIG. 4). This is accomplished by means of flange extension 30 of arm 29 which has a bore engaging attachment bolt 22. The extension 30 is retained in place as by wing nut 31. In order to facilitate use of the actuating arm 29, a handle 33 of tubular form is telescopically connected to the arm and may be retained in place as by means of a suitable detent (not shown).

Also in furtherance of the above purpose, a tensile strut 32 is interposed between the lower portion of the drive cradle 12 and the actuating arm 29. The strut 32 in this case happens to be a flat bar of generally rectangular cross section. The end portions of the strut are each formed with a transverse bore. One such bore engages the attachment bolt 28 of lower connector bracket 24 on the cross member 16, while the other bore engages attachment bolt 34 on actuating arm 29. The strut 32 is held in place on the attachment bolts as by means of wing nuts 35 similar to the wing nut 31.

The lever assembly 10 described above would normally be carried in knock-down form in an appropriate carton stored in the trunk of the car. It weighs only about 8 pounds and no part exceeds 35 inches in length. The device can be readied for operation in an extremely short time by simply connecting the drive cradle 12, actuating arm 29, and tensile strut 32 at the three attaching points shown in FIG. 2; securing the connections with the finger-tightened wing nuts 31, 35; and sliding the tubular handle 33 over the outer end portion of the arm 29.

Once assembled, the device 10 may be quickly deployed by inserting the drive cradle at an angle against the vehicle bumper, as shown in FIG. 2, and applying an upward lifting force to the handle. The leverage ratio of this device, with the arm 29 and handle 33 defining a lever arm of approximately 60 inches, is normally within the range of 4:1 to 5:1. This means that the lifting force to be applied at the end of the handle is only one fourth to one fifth of the force pressing against the bumper to move the vehicle. In an unusual situation where there is not enough room for a 60 inch actuating arm, the handle would not be attached to the arm 29 and the leverage ratio would then be reduced to about 3:1.

Turning next to FIG. 7, there is shown a modified form of drive cradle 38 also exemplifying the present invention. The cradle 38 is a heavy duty structure which comprises in this instance three vertical arms 39, 40, 41 of aluminum or steel having a T-shaped cross section with the stem extending forwardly. These members are secured together near their lower end portions by means of a channel 42 fixed as by rivets 44 to their rear faces with the channel flanges extending rearwardly. The arms 39, 40, 41 are joined together at their upper ends by a cross member 45 also of T-shaped cross section and secured to the arms as by rivets 46 with countersunk heads to maintain a smooth rear face on each arm.

To increase lateral stability, the drive cradle includes angular cross bars or braces 48, 49 extending from the lower portion of the central arm 40 to the junctions between the outside arms 39, 41 and the cross member 45. In addition, the lower end portions of the arms 39, 40 and 41 include laterally spaced ground engaging prongs 50 fixed to their lower ends.

In order to use the drive cradle 38, the actuating arm 29 and tensile strut 32 may be attached to the outwardly projecting central flange 51 of the central arm 40. This may be done by use of the attachment bolts 52, 54 in the central flange 51 and their wing nuts 55, 56. This presupposes that the outer end of the tensile strut has been, or will be, connected to the actuating arm 29. Operation of lever assembly 10 with the drive cradle 38 may then be carried out in the same manner as when using the drive cradle 12.

Figure 10:
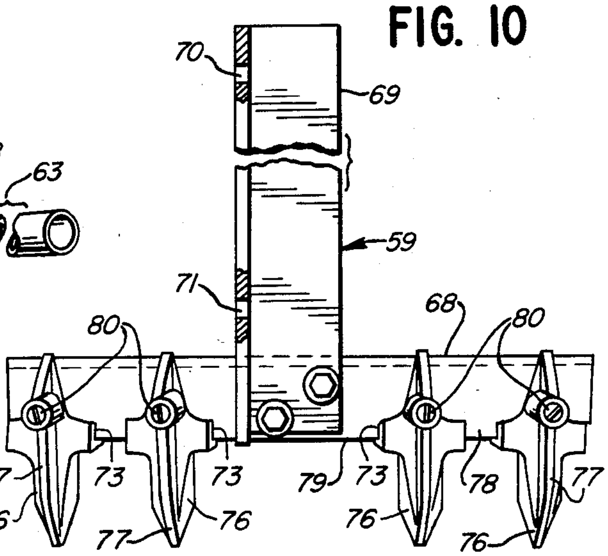
FIG. 10 is a further enlarged view of the inverted T-shaped drive cradle of the lever assembly shown in FIGS. 8 and 9.
Figure 9:
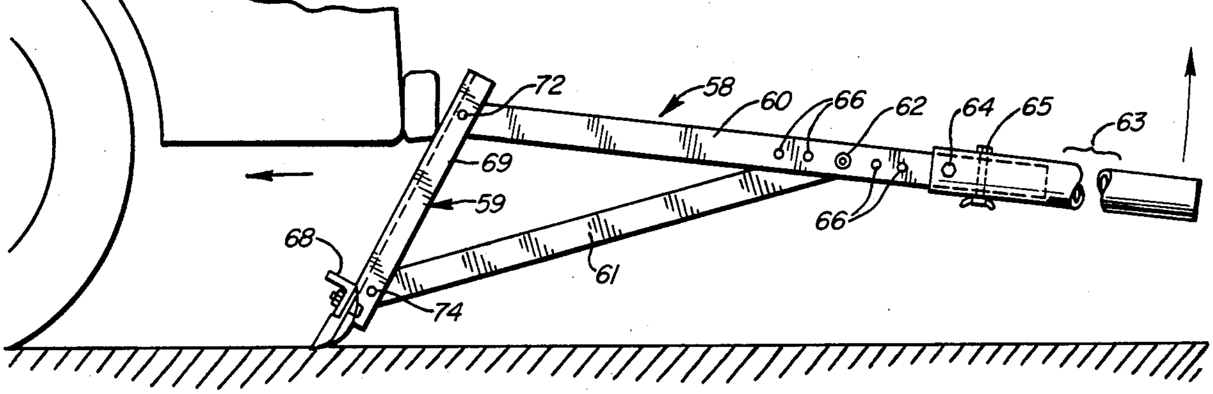
FIG. 9 is an enlarged side elevational view of the lever assembly of FIG. 8 in position to be manually actuated and thereby move the disabled vehicle in the direction of the arrow.

Referring now to FIGS. 8–10, a modified form of knock-down lever assembly 58 is there shown which also embodies the present invention. The assembly 58 is constructed of aluminum or other material of comparable weight and strength. It includes a drive cradle 59, an actuating arm 60 connected to the upper end portion of the cradle 59, and a tensile strut 61 connected to the lower central portion of the cradle 59. The opposite end of the tensile strut 61 is connected as by bolt 62 to an intermediate point on the actuating arm 60. The latter also includes a tubular handle 63 which telescopes over the outboard end of the arm and may be secured thereon as by bolts 64, 65. The actuating arm may also include a plurality of different attachment holes 66 for connection of the tensile strut to accommodate the assembly 58 for use with vehicles of various bumper heights.

For the purpose of enhancing lateral stability, the drive cradle 59 is of inverted T-shaped form with both the horizontal member 68 and the upright member 69 defined by structural angles. These members may be bolted together as shown or welded together if desired. The members 68 and 69 may also be fabricated from other structural shapes such as channels. The drive cradle 59 has two coupling points, in this instance bolt holes 70, 71 situated respectively adjacent the upper and lower ends of the upright member 69. The forward end of the actuating arm 60 is detachably connected as by bolt 72 and a wing nut (not shown) to the upper end portion of the member 69. The forward end of tensile strut 61 is detachably connected as by bolt 74 and a wing nut (not shown) to the lower end portion of member 69.

In order to develop sufficient frictional reaction force under highly adverse conditions, such as pavement or ground covered with snow, ice, mud, oil, or other slippery substances causing vehicle 75 to lose traction, the drive cradle 59 is provided with a plurality of massive, sharp, laterally spaced metal teeth 76. Each of the latter is formed in this instance with a laterally extending 90 degree seat 73 which nests snugly against the lower portion of the rearward face 78 and bottom edge 79 of the horizontal structural member 68. Each tooth 76 has a relatively heavy reinforcing rib 77 extending longitudinally thereof and terminating in a sharp point at its lower end. Each tooth is rigidly secured to the horizontal member 60 by a high tensile strength bolt 80.

The lever assembly 58 may be quickly assembled and positioned for use against the front or rear bumper of the disabled vehicle 75 stalled on a patch of ice, for example. Application of a moderate lifting force on the handle 63, as indicated in FIG. 9, will impart substantial increments of motion to the vehicle which quickly gets it off the ice to an area of effective traction.

Referring more specifically to the lever assembly 58, it has been determined experimentally by the applicant that optimum results are obtained when the device includes certain angular relationships. The first such relationship is that the angle between the actuating arm 60 and the drive cradle 59 should be approximately 114 degrees. The second relationship is that the assembly 58 be initially positioned against the vehicle bumper at an angle of approximately 30 degrees backwardly inclined from vertical. In this position, an upward pull on the handle 63 will not only impart a nearly horizontal force against the bumper but at the same time avoid slippage of the ground engaging teeth. The device then will effectively move the vehicle with a leverage ratio of about 3:1 to 5:1, depending on whether or not the handle 63 is attached.

Figure 13:
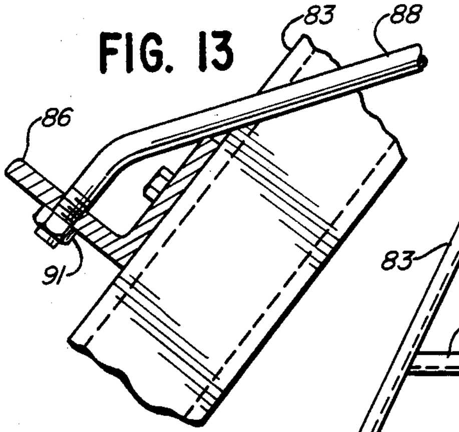
FIG. 13 is an enlarged, fragmentary vertical sectional view through the cross member and tensile strut, taken in the plane of the line 13—13 in FIG. 12.
Figure 12:
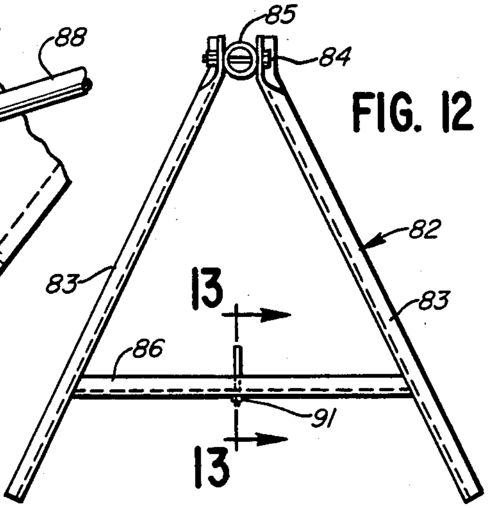
FIG. 12 is an enlarged front elevational view of the A-frame cradle of the lever assembly shown in FIG. 11.
Figure 11:
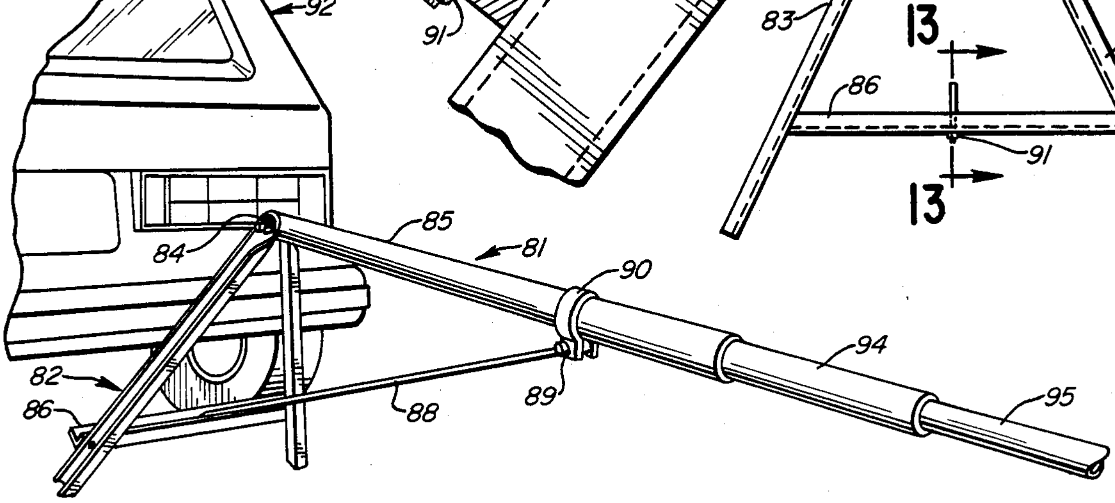
FIG. 11 is a perspective view of another form of lever assembly of simplified construction using an A-frame cradle and a tensile strut in the form of a small diameter rod.

FIGS. 11–13 show still another form of lever assembly 81 also embodying the invention. This assembly comprises an A-frame drive cradle 82 having two upwardly converging channels 83 with their flanges facing outwardly. The upper end portions of the channels 83 are connected as by bolt 84 to the forward end portion of a tubular actuating arm 85. The rearward flanges may be cut away for a short distance in the vicinity of the bolt to permit easy access thereto with a wrench. A horizontal cross member 86 in the form of a structural angle is mounted across the channels 83 a short distance from their lower ends. A tensile strut 88 in the form of a small diameter metal rod has an eye formed in its rearward end which is connected as by bolt 89 to a collar 90 on the tubular actuating arm 85. The opposite end of the strut 88 is connected to the angle defining cross member 86, extending through an aperture in the flange of the cross member and being secured as by means of a nut 91 on the opposite side (FIG. 13).

The lever assembly 81, shown in operating position against the bumper of vehicle 92, is operated in the same manner as the lever assemblies described earlier herein. As in the case of the others, the assembly 81 is of the knock-down type and may be quickly assembled and disassembled. When necessary, additional leverage may be obtained by outwardly extending the telescoping sections 94, 95 of the actuating arm 85.

What is claimed is:

1. A knock-down car moving lever assembly manually operable by one individual without additional assistance for moving to a safe location a disabled automotive vehicle which has lost power or traction, said assembly comprising, in combination:

(a) a drive cradle having a first detachable connecting means adjacent its upper end portion and a second detachable connecting means adjacent its lower end portion;

(b) a plurality of laterally spaced ground engaging teeth mounted in depending relation on said drive cradle;

(c) an actuating arm fixed to said first detachable connecting means at said upper end portion of said drive cradle;

(d) a tensile strut fixed at one end to said second detachable connecting means adjacent said lower end portion of said drive cradle, and detachably connected at its opposite end to an intermediate point on said actuating arm; and (e) a tubular handle mounted on said actuating arm in an area spaced longitudinally outward from said opposite end of said tensile strut.

2. The combination set forth in claim 1, wherein said drive cradle, said actuating arm, and said tensile strut are detachably connected by bolts with wing nuts and said handle is a section of tubular material telescoped over the outer end portion of said actuating arm.

3. The combination defined in claim 1, wherein said drive cradle is in the form of an "A" frame.

4. The combination defined in claim 1, wherein said drive cradle is in the form of a generally rectangular frame.

5. The combination defined in claim 1, wherein said drive cradle has ground-engaging prongs projecting from the lower ends of its legs.

6. The combination set forth in claim 4, wherein said drive cradle has ground-engaging prongs on the lower ends of its legs.

7. A knock-down car moving lever assembly for moving a disabled automotive vehicle manually by one individual without additional assistance, said assembly comprising, in combination:

(a) a drive cradle of inverted T-shape having a first connecting means adjacent its upper end portion and a second connecting means adjacent its lower end portion;

(b) said drive cradle comprising an upright structural member and a horizontal structural member rigidly connected thereto;

(c) a plurality of reinforced teeth mounted in laterally spaced relation on said horizontal member, each said tooth having a downwardly projecting, sharp ground engaging point and a relatively heavy reinforcing rib extending longitudinally thereof;

(d) an actuating arm fixed to said first connecting means at said upper end portion of said drive cradle;

(e) a tensile strut fixed at one end to said second connecting means adjacent said lower end portion of said drive cradle, and fixed at its opposite end to an intermediate point on said actuating arm, and (f) means for manually gripping said actuating arm in an area spaced longitudinally outward from said opposite end of said tensile strut.

8. The combination defined in claim 7, wherein said drive cradle has a plurality of ground engaging teeth projecting downwardly from said horizontal structural member of said inverted T-shape drive cradle, each said tooth having a laterally extending seat of generally L-shaped cross section nested against the lower edge portion of said horizontal structural member.

9. The combination defined in claim 8, wherein said ground engaging teeth are located on each side of said upright structural member of said inverted T-shape drive cradle and rigidly secured to said horizontal structural member.

10. The combination set forth in claim 7, wherein the included angle between said actuating arm and said drive cradle is approximately 114 degrees.

11. The combination set forth in claim 3, wherein said "A" frame drive cradle comprises a pair of upwardly converging members of channel cross section.

12. The combination set forth in claim 3, wherein said tensile strut comprises a metal rod.

13. The combination set forth in claim 10, wherein said actuating arm is of tubular construction adjacent its outboard end.

* * * * *